(12) United States Patent
Yamaguchi et al.

(10) Patent No.: US 6,499,621 B1
(45) Date of Patent: Dec. 31, 2002

(54) SEALING CONTAINER AND METHOD FOR SEALING DEVICE IN THE SAME

(75) Inventors: Takashi Yamaguchi, Hikone (JP); Mikihiro Yamashita, Echi-gun (JP); Keizo Ganse, Yokaichi (JP)

(73) Assignee: Matsushita Electric Works, Ltd., Kadoma (JP)

( * ) Notice: Subject to any disclaimer, the term of this patent is extended or adjusted under 35 U.S.C. 154(b) by 274 days.

(21) Appl. No.: 09/602,020

(22) Filed: Jun. 23, 2000

(30) Foreign Application Priority Data

Jun. 25, 1999 (JP) .......................... 11-180187

(51) Int. Cl.[7] .............................. B65D 6/00
(52) U.S. Cl. ................ 220/612; 220/4.02; 220/613; 220/DIG. 13
(58) Field of Search ................ 220/612, 613, 220/4.02, DIG. 29, DIG. 31, DIG. 13

(56) References Cited

U.S. PATENT DOCUMENTS

| | | | | |
|---|---|---|---|---|
| 3,095,112 A | * | 6/1963 | Weinstein et al. | 220/613 |
| 3,648,337 A | * | 3/1972 | Greskamp et al. | 220/DIG. 31 X |
| 3,910,448 A | | 10/1975 | Evans et al. | |
| 4,586,624 A | * | 5/1986 | Shaw | 220/613 |
| 5,183,967 A | * | 2/1993 | Lin | 220/4.02 X |
| 5,185,499 A | * | 2/1993 | Yahraus | 220/4.02 X |
| 5,199,593 A | * | 4/1993 | Kita | 220/613 |

FOREIGN PATENT DOCUMENTS

| | | |
|---|---|---|
| FR | 2 487 569 | 1/1982 |
| JP | 9-289001 | 11/1997 |

* cited by examiner

*Primary Examiner*—Steven Pollard
(74) *Attorney, Agent, or Firm*—Oblon, Spivak, McClelland, Maier & Neustadt, P.C.

(57) ABSTRACT

A sealing container assembly which is configured to hermetically contain a device therein includes a case, a lid member, a connecting member and a melting member. The case has an opening and is configured to contain the device therein. The lid member is configured to be connected to the case by welding to close the opening of the case. The connecting member is configured to connect the device contained inside the case to an outside of the case and configured to be sandwiched between the case and the lid member. The melting member has a melting point lower than those of the case and the lid member and is configured to be melted to seal gaps between the connecting member and the case and between the connecting member and the lid member when the lid member is connected to the case by welding.

19 Claims, 5 Drawing Sheets

FIG. 4(a)
FIG. 4(b)
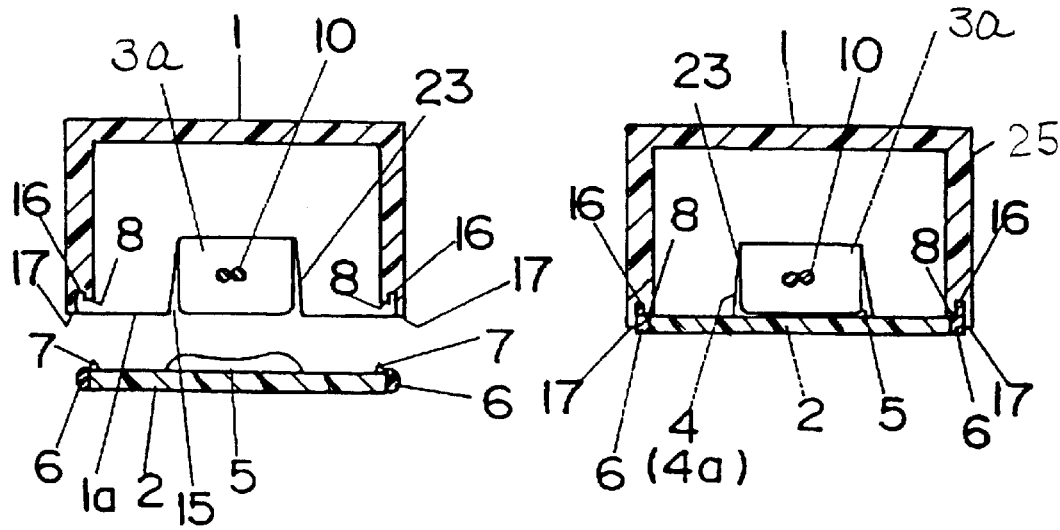
FIG. 5
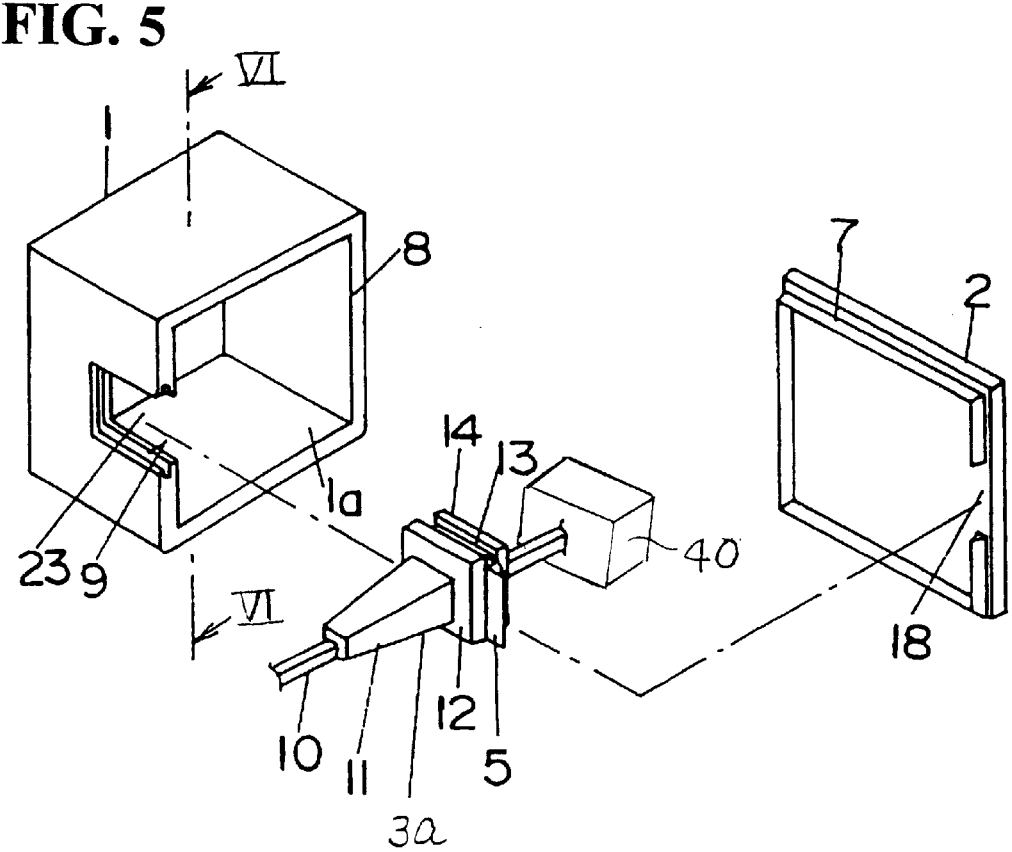

US 6,499,621 B1

SEALING CONTAINER AND METHOD FOR SEALING DEVICE IN THE SAME

CROSS-REFERENCE TO RELATED APPLICATIONS

The present application claims priority under 35 U.S.C. §119 to Japanese Patent Application No. H11-180187, filed Jun. 25, 1999, entitled "Sealing Container of A Waterproof Apparatus". The contents of that application are incorporated herein by reference in their entirety.

BACKGROUND OF THE INVENTION

1. Field of the Invention

The present invention relates to a sealing container assembly which is configured to hermetically contain a device therein. Further, the present invention relates to a sealing container and a method for sealing a device in the sealing container.

2. Description of the Background

The waterproof apparatus such as a non-contact type battery charger has a sealing container formed by welding, for example, by heating and pressing. Conventionally, this sealing container has a case and a sealing member made of the same material as the case. After the sealing member covers the case, the case and the sealing member are welded for forming the sealing container. If a connecting member such as a bushing which is made of a different material from the case and the sealing member is attached to the waterproof apparatus, the portion to which the connecting member is attached is not welded. Instead, glue or oil is used for filling the gap between the waterproof apparatus and the connecting member at the sealing interface.

Another conventional sealing container is disclosed in Japanese unexamined patent publication (kokai) No. H9-289001. The contents of this publication are incorporated herein by reference in their entirety. According to this conventional technique, in a sealed type lead-acid battery, a protruding portion of an electrode and a barrel member of a lid made of different materials from each other are heated and welded. Then the welded portion is filled with a sealing material, which is hardened to form a sealing container.

SUMMARY OF THE INVENTION

According to one aspect of the present invention, a sealing container assembly which is configured to hermetically contain a device therein includes a case, a lid member, a connecting member and a melting member. The case has an opening and is configured to contain the device therein. The lid member is configured to be connected to the case by welding to close the opening of the case. The connecting member is configured to connect the device contained inside the case to an outside of the case and configured to be sandwiched between the case and the lid member. The melting member has a melting point lower than those of the case and the lid member and is configured to be melted to seal gaps between the connecting member and the case and between the connecting member and the lid member when the lid member is connected to the case by welding.

According to another aspect of the invention, a sealing container which hermetically contains a device therein includes a case, a lid member, a connecting member and a melting member. The case has an opening and contains the device therein. The lid member is connected to the case by welding to hermetically close the opening of the case. The connecting member connects the device contained inside the case to an outside of the case. The connecting member is sandwiched between the case and the lid member. The melting member seals gaps between the connecting member and the case and between the connecting member and the lid member by being melted when the lid member is connected to the case by welding. The melting member has a melting point lower than those of the case and the lid member.

Further, according to the other aspect of the invention, a method for sealing a device in a sealing container includes providing the device in a case. The device is connected to an outside of the case via a connecting member. The connecting member is provided to be sandwiched between the case and a lid member. The lid member is connected to the case by welding to close an opening of the case. A melting member is melted to seal gaps between the connecting member and the case and between the connecting member and the lid member when the lid member is connected to the case by welding. The melting member has a melting point lower than those of the case and the lid member.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIGS. 4(a) and 4(b) are IV—IV cross sections of the sealing container assembly and a sealing container shown in FIG. 3;

FIG. 5 is a perspective view of a sealing container assembly according to a third embodiment of the present invention;

DESCRIPTION OF THE PREFERRED EMBODIMENTS

Figure 1:
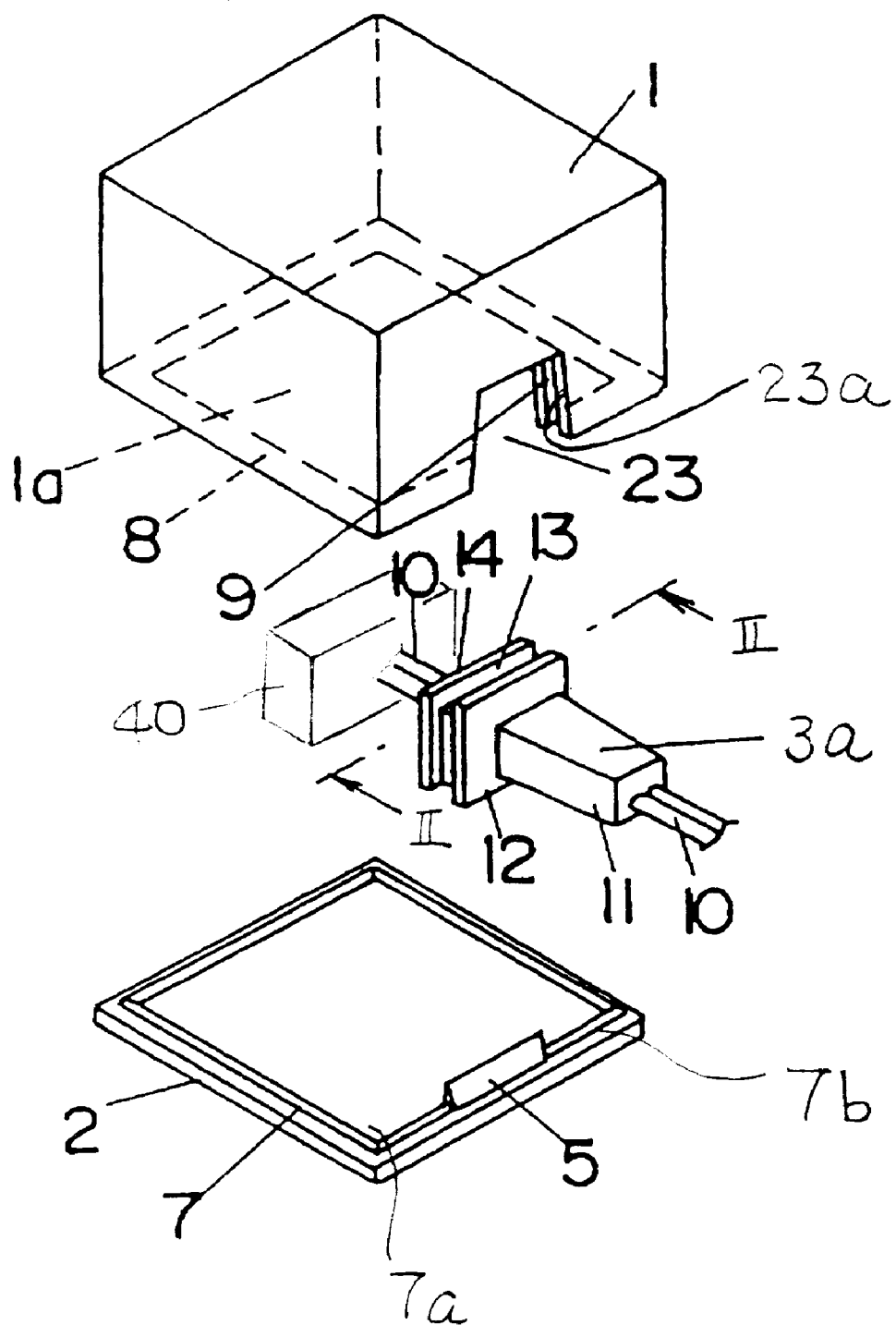
FIG. 1 is a perspective view of a sealing container assembly according to a first embodiment of the present invention.

The preferred embodiments will now be described with reference to the accompanying drawings, wherein like reference numerals designate corresponding or identical elements throughout the various drawings.

Figure 2A:
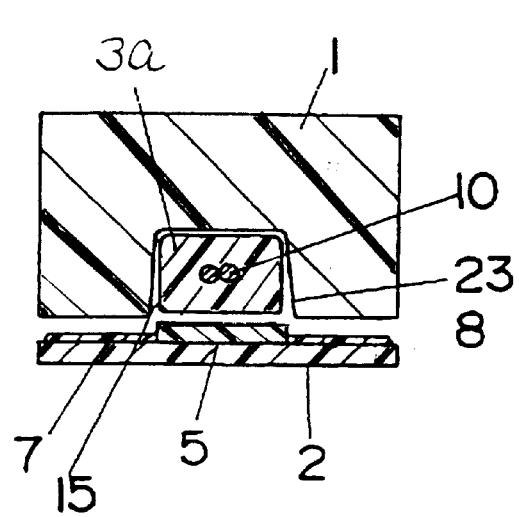
FIGS. 2(a) and 2(b) are II—II cross sections of the sealing container assembly and a sealing container shown in FIG. 1.
Figure 2B:
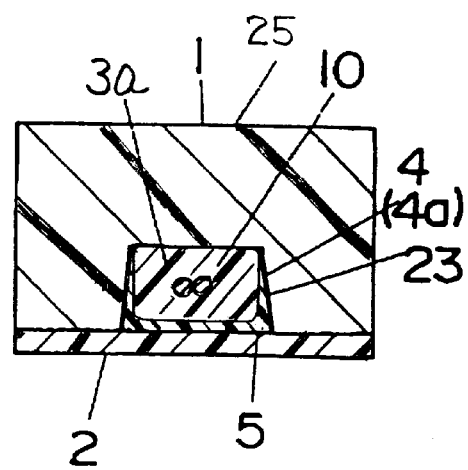

Referring now FIGS. 1, 2(a) and 2(b), there is shown a sealing container of a waterproof apparatus in accordance with a first embodiment of the present invention. For example, the waterproof apparatus is a non-contact type battery charger.

As shown in FIGS. 1, 2(a) and 2(b), the sealing container assembly includes a case (1), a lid member (2) and a cord bushing (3a) which is a connecting member. The cord bushing (3a) connects a device (40) which is sealed in the sealing container and another apparatus which is provided outside the sealing container. When the case (1), the lid member (2) and the cord bushing (3a) are assembled, they form a sealing container (25) of the waterproof device apparatus. The case (1) and the lid member (2) are normally made of the same material such as, for example, a synthetic resin.

The case (1) is a container having an opening (1a) that opens downward in FIG. 1. A lower end surface of sidewall of the case (1) is formed flat as a weld reception surface (8). The sidewall of the case (1) has a retaining recess (23) that is a cutout portion opening downward. An inner surface (23a) of the retaining recess (23) is provided with an inner groove (9).

The dimensions of an inside surface of the lid member (2) are substantially the same as those of a rim of the lower end surface of the case (1). A rim of the inside surface of the lid member (2) has a weld rib (7) corresponding to the weld reception surface (8), and a melting member (5) corresponding to the retaining recess (23). The weld rib (7) is formed continuously corresponding to the weld reception surface (8), and the melting member (5) is attached to the weld rib (7) disposed between both ends (7a and 7b) of the weld rib (7) with contact to each other. The melting member (5) protrudes upward from the weld rib (7) as shown in FIG. 1. The weld rib (7) may be made of the same material as the case (1) and the lid member (2). The melting member (5) is made of a material having a melting point lower than that of the case (1) or the lid member (2), and is made of a rubber or a vinyl chloride, for example.

For example, a cord bushing (3a) is made of a material different from that of the case (1) or the lid member (2), and is made of, for example, a vinyl chloride. The cord bushing (3a) includes a fit-in portion (a flange) (14) having a contour fitting in the inner groove (9) of the case (1) at one side and a stopper portion (12) having a dimension slightly larger than an opening of the retaining recess (23) at the other side. A small-dimension portion (13) whose contour is slightly smaller than the opening of the retaining recess (23) is formed between the fit-in portion (14) and the stopper portion (12). A protruding portion (11) is formed integrally with the stopper portion (12). From an end of the protruding portion (11) to a surface of the fit-in portion (14) in the cord bushing (3a), there is a bore that a power cord (10) passes through.

The case (1), the lid member (2) and the cord bushing (3a) are used for forming the sealing container of the waterproof apparatus. First, the device (40) is provided in the case (1) and the cord bushing (3a) is fitted in the retaining recess (23) of the case (1). The fit-in portion (14) of the cord bushing (3a) fits in the inner groove (9) of the retaining recess (23), and the stopper portion (12) places outside of the case (1), so that the small-dimension portion (13) is in the retaining recess (23). Accordingly, the cord bushing (3a) is securely held by the case (1). Further, gaps between the cord bushing (3a) and the case (1) may be sealed more completely. The protruding portion (11) is positioned outside the case (1). An end of the power cord (10) led outside of the case (1) via the cord bushing (3a) is connected to a power plug, while the other end of the power cord (10) led inside of the case (1) is connected to the device (40) (for example, electric components) housed in the case (1).

Then, the lid member (2) is positioned to close the opening (1a) of the case (1). More specifically, the weld rib (7) is positioned to contact the weld reception surface (8), and the melting member (5) is positioned at the retaining recess (23). Next, a welding machine, for example, an ultrasonic welding machine, a high frequency welding machine, a hot air welding machine, a spot welding machine or the like is used for heating portions of the lower end surface of the lid member (2) which correspond to the weld rib (7) and the melting member (5) and for pressing the case (1) to the lid member (2) so as to weld them. For example, using the ultrasonic welding machine, portions of the lower surface of the lid member (2) which correspond to the weld rib (7) and the melting member (5) are heated so as to weld the case (1) to the lid member (2). Accordingly the lid member (2) hermetically close the opening (1a) of the case(1).

In this heating and pressing process, the weld rib (7) melts and welds to the weld reception surface (8) of the case (1) along the entire length of the weld rib (7), so that the case (1) and the lid member (2) welds. The cord bushing (3a) is inserted in a retaining opening (4a) defined by the retaining recess (23) of the case (1) and the inside surface of the lid member (2). In other words, the retaining opening (4a) is formed as a retaining portion (4) that retains the cord bushing (3a). At the same time, the melting member (5) also melts and flows in a gap (15) between a rim of the retaining opening (4a) and the cord bushing (3a), so that the gap (15) is sealed by the melting member (5).

As stated above, the case (1) and the lid member (2) are welded along the entire length of the weld rib (7). In the retaining portion (4) for retaining the cord bushing (3a) between the case (1) and the lid member (2), the gap (15) between the cord bushing (3a) and the retaining portion (4) is filled with the melting member (5), so that the housing (25) of the waterproof apparatus is completely sealed.

The melting member (5) has a melting point lower than those of the case (1) and the lid member (2). Accordingly, the melting member (5) is melted to seal the gap between the cord bushing (3a) and the case and the gap between the cord bushing (3a) and the lid member (2) when the lid member (2) is welded to the case (1). Even when the cord bushing (3a) is made from a material different from materials which the case (1) and the lid member (2) are made from, the device may be sealed in the sealing container only by welding without carrying out other steps.

Figure 3:
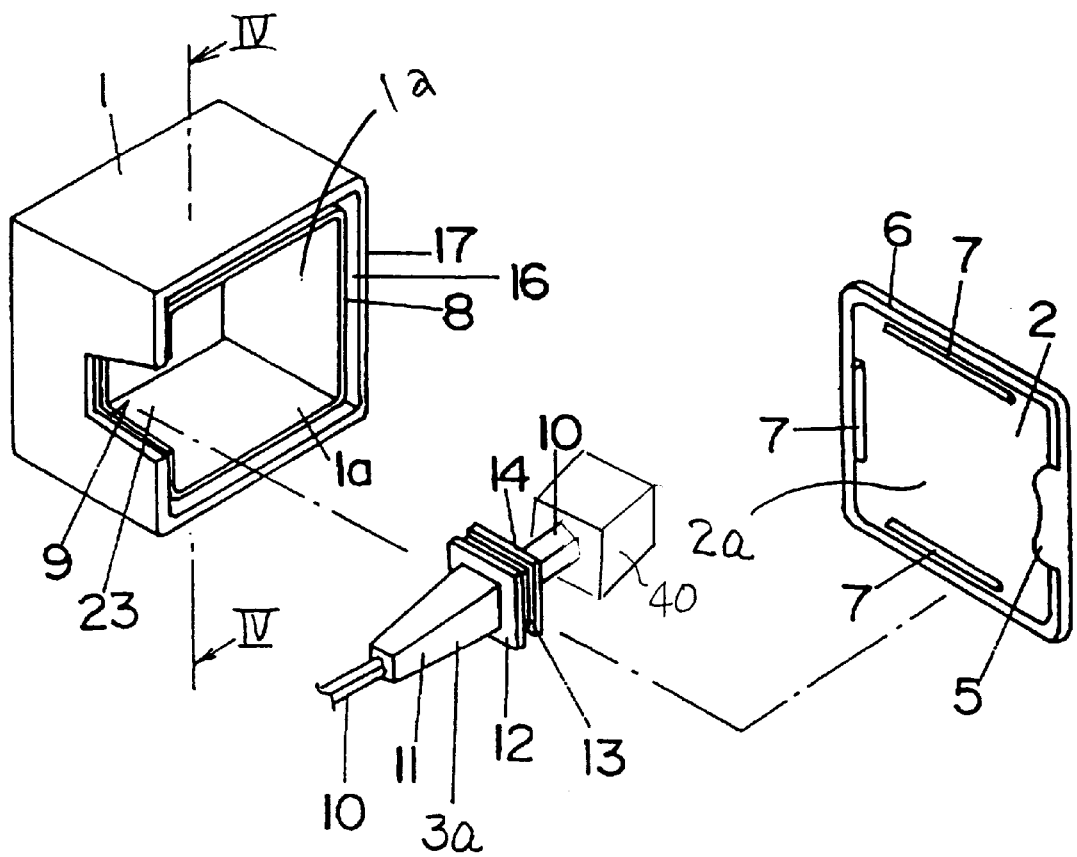
FIG. 3 is a perspective view of a sealing container assembly according to a second embodiment of the present invention.

Next, referring to FIGS. 3, 4(a) and 4(b), there is shown the sealing container of the waterproof apparatus in accordance with a second embodiment of the present invention.

As shown in FIGS. 3, 4(a) and 4(b), the case (1) has the opening (1a) and the retaining recess (23) in the same way as the above-mentioned first embodiment. The lower end surface of the sidewall of the case (1) is provided with a protruding portion (17) at an outer portion, a groove portion (16) at a middle portion and the weld reception surface (8) at an inner portion. The groove portion (16) is formed as a groove that opens downward in FIG. 4(a). Lower surfaces of the protruding portion (17) and the weld reception surface (8) formed on both sides of the groove portion (16) are flat, and the protruding portion (17) protrudes downward in FIG. 4(a) from the weld reception surface (8).

The dimension of the inside surface of the lid member (2) is substantially the same as that of the rim of the weld reception surface (8). An outer rim portion of the inside surface (2a) of the lid member (2) has the weld ribs (7) at the position corresponding to the weld reception surface (8). The weld ribs (7) are formed at three sides of a rectangular inside surface of the lid member (2), separately from each other. The weld rib (7) can be made of the same material as the case (1) and the lid member (2). The lid member (2) has a seal member (6) around an outer rim thereof corresponding to the groove portion (16) and the retaining recess (23) of the case (1). The seal member (6) is provided on an outer peripheral side surface of the lid member (2). The seal member (6) is made of a material having a melting point lower than that of the case (1) and the lid member (2). The seal member (6) is made of a rubber, for example. In addition, a part of the seal member (6) protrudes upward more than the other part in FIG. 4(a). This part is the melting member (5). The melting member (5) is provided at a portion of the rectangular inside surface of the lid member (2) at which the weld ribs (7) are not formed and which corresponds to the retaining recess (23). The melting member (5) is made from the same material as the seal member (6). The melting member (5) may be integral with the seal member (6).

The cord bushing (3a) is the same as that used in the first embodiment explained above.

The case (1), the lid member (2) and the cord bushing (3a) are used for forming the sealing container of the waterproof apparatus. First, the device (40) is provided in the case (1) and the cord bushing (3a) is inserted into the retaining recess (23) of the case (1). The fit-in portion (14) of the cord bushing (3a) fits in the inner groove (9) of the retaining recess (23), and the stopper portion (12) places outside of the case (1), so that the small-dimension portion (13) is in the retaining recess (23). The protruding portion (11) is in the outside of the case (1). The end of the power cord (10) led outside of the case (1) via the cord bushing (3a) is connected to a power plug, while the other end of the power cord (10) inside of the case (1) is connected to the device (40) housed in the case (1).

Then, the lid member (2) is mounted on the case (1) to close the opening (1a). More specifically, the weld ribs (7) contact the weld reception surface (8), the seal member (6) is positioned in the groove portion (16), and the melting member (5) is positioned to correspond to the retaining recess (23). Next, The welding machine is used for heating the portions of the lower surface of the lid member (2) which correspond to the weld ribs (7) and the melting member (5) and for pressing the case (1) to lid member (2) so as to weld them. For example, using the ultrasonic welding machine, the weld ribs (7) and the melting member (5) at the lower surface of the lid member (2) heats and the case (1) welds to the lid member (2).

In this heating and pressing process, the weld ribs (7) melts and welds to the weld reception surface (8) of the case (1), so that the case (1) and the lid member (2) welds, and the cord bushing (3a) is fixed in the retaining opening (4a) defined by the retaining recess (23) of the case (1) and the inside surface of the lid member (2). In other words, the retaining opening (4a) is formed as a retaining portion (4) that retains the cord bushing (3a). At the same time, the seal member (6) also melts and flows in the groove portion (16) of the case (1), so that a gap between the outer rim of the lid member (2) and the groove portion (16) of the case (1) is sealed by the seal member (6). In addition, melting member (5) of a part of the seal member (6) also melts and flows in the gap (15) between the rim of the retaining opening (4a) and the cord bushing (3a), so that the gap (15) is sealed by the melting member (5).

As stated above, the case (1) and the lid member (2) are welded with the weld rib (7) and the gap between the case (1) and the lid member (2) is sealed by the seal member (6). In the retaining portion (4) for retaining the cord bushing (3a) between the case (1) and the lid member (2), the gap (15) between the cord bushing (3a) and the retaining portion (4) fills with the melting member (5), so that the housing (25) is completely closed.

Figure 6A:
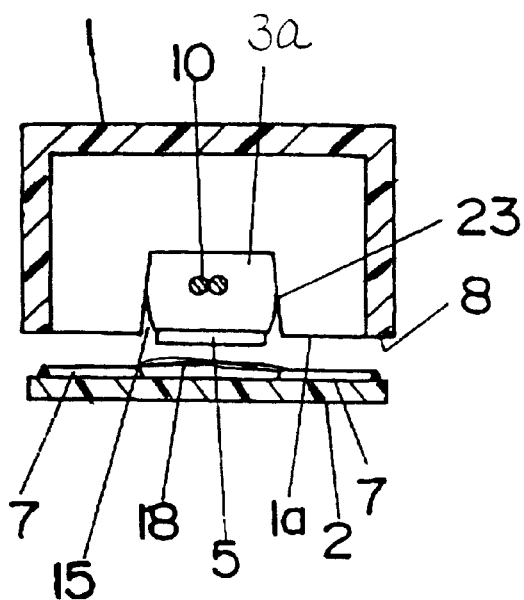
FIGS. 6(a) and 6(b) are VI—VI cross sections of the sealing container assembly and a sealing container shown in FIG. 5.
Figure 6B:
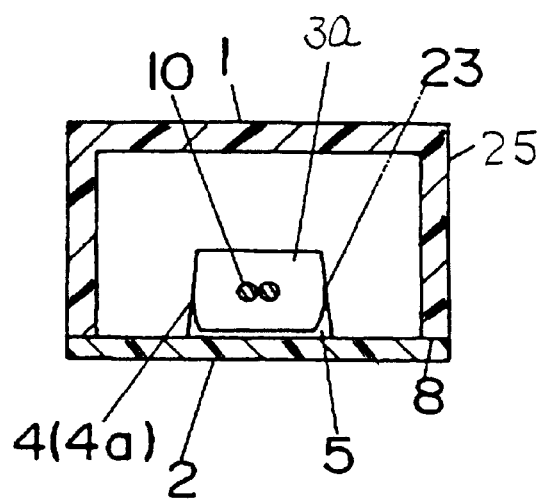

Next, referring FIGS. 5, 6(a) and 6(b), there is shown the sealing container of the waterproof apparatus in accordance with a third embodiment of the present invention.

As shown in FIGS. 5, 6(a) and 6(b), the case (1) is the same as that in the first embodiment.

The dimension of the inside surface of the lid member (2) is substantially the same as that of the outer rim of the lower surface of the case (1). The outer rim portion of the inside surface of the lid member (2) has the weld rib (7) at the position corresponding to the weld reception surface (8) and a cutout portion (18) without the weld rib (7) at the position corresponding to the retaining recess (23). The weld rib (7) forms continuously at the position corresponding to the weld reception surface (8), and the cutout portion (18) is provided between the both ends of the weld rib (7). For example, the weld rib (7) is made of the same material as the case (1) and the lid member (2).

For example, a cord bushing (3a) is made of a material different from that of the case (1) or the lid member (2). Additionally, the cord bushing (3a) includes the melting member (5) protruded downward in FIG. 6(a) from a lower portion of the cord bushing (3a). In other words, the melting member (5) is provided at a lower portion of the small-dimension portion (13) in FIG. 6(a), and a lower end of the melting member (5) protrudes downward more than the fit-in portion (14) and the stopper portion (12) in FIG. 6(a). The melting member (5) is made of a material having a melting point lower than that of the case (1) and the lid member (2), and is made of a rubber or a vinyl chloride, for example. The melting member (5) can be made of the same material as the cord bushing (3a).

The case (1), the lid member (2) and the cord bushing (3a) are used for forming the sealing container of the waterproof apparatus. First, the device (40) is provided in the case (1) and the cord bushing (3a) is placed on the retaining recess (23) of the case (1). The fit-in portion (14) of the cord bushing (3a) fits in the retaining recess (23), and the stopper portion (12) places outside of the case (1), so that the small-dimension portion (13) is in the retaining recess (23). The protruding portion (11) is in the outside of the case (1). The end of the power cord (10) led outside the case (1) via the cord bushing (3a) connects to a power plug, while the other end of the power cord (10) inside the case (1) connects to the device (40) housed in the case (1). The melting member (5) provided to the cord bushing (3a) is provided at the lower portion of the retaining recess (23) in FIG. 6(a).

Then, the lid member (2) is positioned to close the opening (1a) of the lower surface of the case (1). More specifically, the weld rib (7) of the lid member (2) is positioned to contact the weld reception surface (8) of the case (1), and the melting member (5) of the cord bushing (3a) is positioned in the cutout portion (18) of the lid member (2). Then, the welding machine is used for heating the portions corresponding to the weld rib (7) and the melting member (5) at the lower surface of the lid member (2) and for pressing the case (1) to the lid member (2) so as to weld them. For example, using the ultrasonic welding machine, the portions corresponding to the weld rib (7) and the melting member (5) at the lower surface of the lid member (2) heats and the case (1) welds to the lid member (2).

In this heating and pressing process such as the ultrasonic welding process, the weld rib (7) melts and welds to the weld reception surface (8) of the case (1), so that the case (1) and the lid member (2) welds, and the cord bushing (3a) is fixed in the retaining opening (4a) defined by the retaining recess (23) of the case (1) and the inside surface of the lid member (2). In other words, the retaining opening (4a) forms as the retaining portion (4) that retains the cord bushing (3a). At the same time, the melting member (5) also melts and flows in the gap (15) between the rim of the retaining opening (4a) and the cord bushing (3a), so that the gap (15) seals by the melting member (5).

As stated above, the case (1) and the lid member (2) welds with the weld rib (5). In the retaining portion (4) for retaining the cord bushing (3a) between the case (1) and the lid member (2), the gap (15) between the cord bushing (3a) and the retaining portion (4) fills with the melting member (5), so that the housing (25) is completely closed.

Figure 7A:
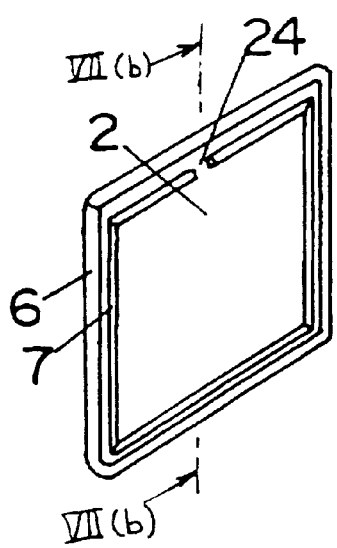
FIGS. 7(a) and 7(b) show a fourth embodiment of the present invention.
Figure 7B:
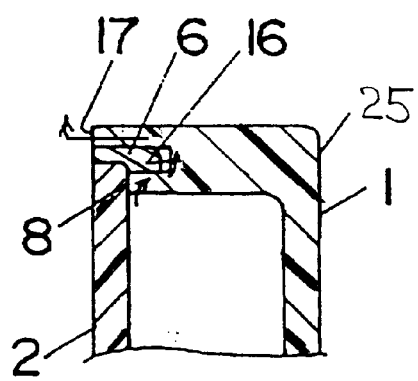

Next, referring FIGS. 7(a) and 7(b), there is shown the sealing container of the waterproof apparatus in accordance with a fourth embodiment of the present invention.

As shown in FIGS. 7(a) and 7(b), the lower end surface of the sidewall of the case (1) provides with the groove portion (16), the protruding portion (17) and the weld reception surface (8) in the same way as the above-mentioned second embodiment.

The lid member (2) has the seal member (6) around the outer rim thereof in the same way as the above-mentioned second embodiment. In addition, the outer rim portion of the inside surface of the lid member (2) has the weld rib (7) at the position corresponding to the weld reception surface (8). A cutout portion (24) is formed in the weld rib (7). At the cutout portion (24), there is no rib (7). Accordingly, the cutout portion (24) operates to release an excessive pressure. The weld rib (7) is provided along an entire periphery of the lid member (2) except for the cutout portion (24). The weld rib (7) can be made of the same material as the case (1) and the lid member (2).

The retaining recess (23), the cord bushing (3a), the melting member (5) and other members of the case (1) can be constituted in the same way as the above-explained first through third embodiments.

The case (1) and the lid member (2) are used for forming the sealing container of the waterproof apparatus. The lid member (2) is positioned to close the opening (1a) of the lower surface of the case (1). More specifically, the weld rib (7) is positioned to contact the weld reception surface (8), and the seal member (6) is positioned in the groove portion (16). Next, the welding machine is used for heating the portion corresponding to the weld rib (7) at the lower surface of the lid member (2) and for pressing the case (1) to lid member (2) so as to weld them. For example, using the ultrasonic welding machine, the portions corresponding to the weld rib (7) and the melting member (5) at the lower surface of the lid member (2) heats and the case (1) welds to the lid member (2).

In this heating and pressing process such as the ultrasonic welding process, the weld rib (7) melts and welds to the weld reception surface (8) of the case (1), so that the case (1) and the lid member (2) welds, and the cord bushing (3a) fixes in the retaining opening (4a) defined by the retaining recess (23) of the case (1) and the inside surface of the lid member (2). In other words, the retaining opening (4a) forms as the retaining portion (4) that retains the cord bushing (3a). At the same time, the seal member (6) also melts and flows in the groove portion (16) of the case (1), so that the gap between the outer rim of the lid member (2) and the groove portion (16) is sealed by the seal member (6). At the same time, the melting member (5) formed at the lid member (2) or the cord bushing (3a) also melts and flows in the gap (15) between the rim of the retaining opening (4a) and the cord bushing (3a), so that the gap (15) is sealed by the melting member (5). Then, the melting member (5) places the position not to close the cutout portion (24), for example, the sides different from the side of the cutout portion (24) on the inside surface of the lid member (2).

As stated above, the case (1) and the lid member (2) are welded at the weld rib (7) except for the cutout portion (24) and further sealed with the seal member (6), so that a gap between the outer rim of the lid member (2) and the groove portion (16) of the case (1) is sealed by the seal member (6). Therefore, the housing (25) is completely closed when the pressure inside the sealing container is not excessively high, i.e., is in a normal state. If a gas is generated in a space within the housing (25) due to a breakdown of the device in the container, and an inner pressure increases, the gas can reach the groove portion (16) through the cutout portion (24) for releasing the excessive pressure. This excessively high pressure gas will press the seal member (6) in the groove portion (16) so as to deform the seal member (6) elastically. Thus, the gas can be released outside the housing (25). Therefore, a burst of the housing (25) due to an increase of the inner pressure can be prevented.

Figure 8:
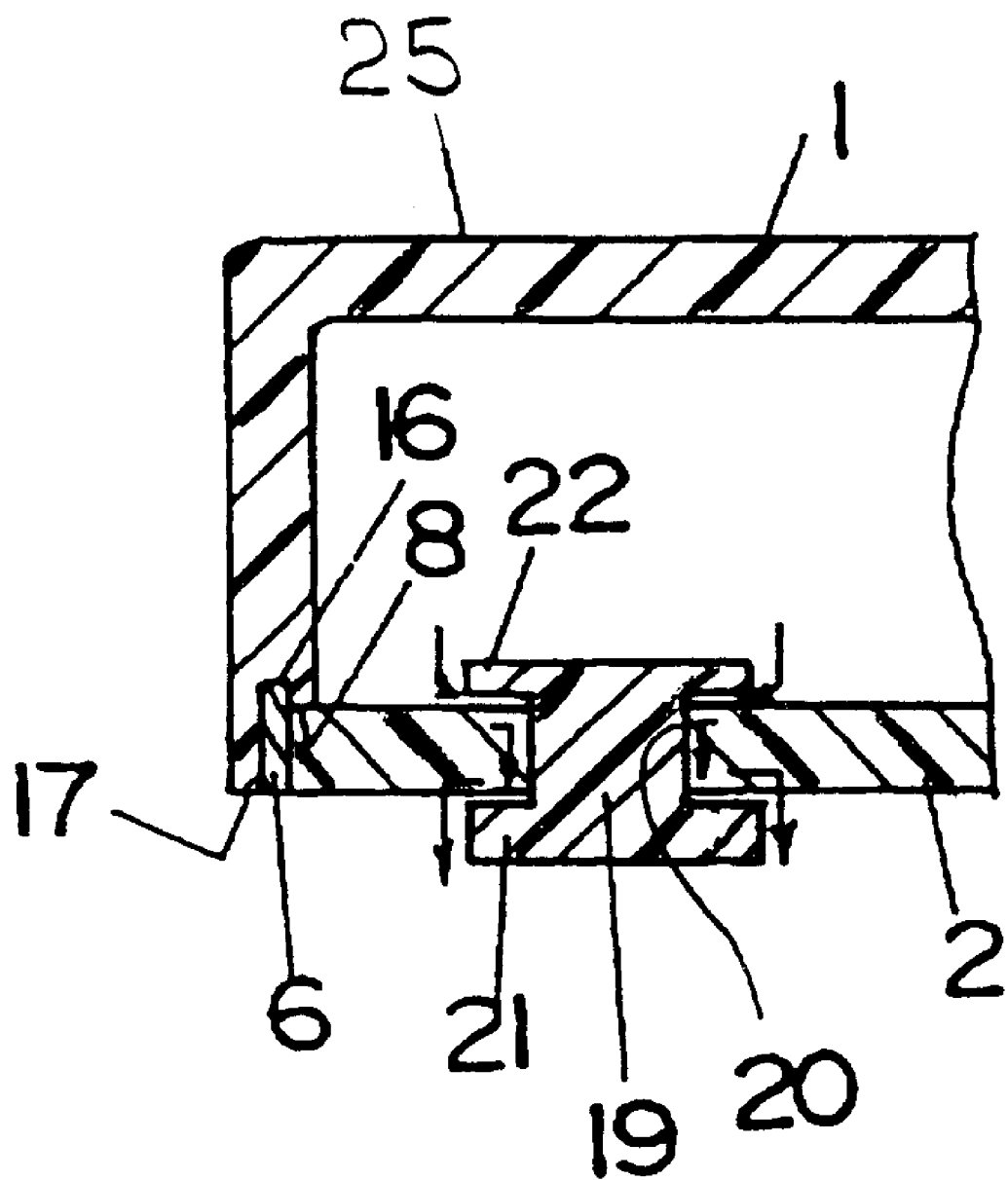
FIG. 8 shows a fifth embodiment of the present invention.

Next, referring FIG. 8, there is shown the sealing container of the waterproof apparatus in accordance with a fifth embodiment of the present invention.

As shown in FIG. 8, the lid member (2) has a through hole (20) connecting an inside and an outside of the housing (25). A leg member (a release valve) (19) which constitutes a pressure release mechanism is inserted in the through hole (20). For example, a leg member (a center shaft portion) (19) is made of a rubber. An inner flange member (22) protrudes in a lateral direction at an upper portion of the leg member (19) inside the housing (25) for preventing the leg member (19) from dropping from the housing (25), while an outer flange member (21) protrudes in a lateral direction at a lower portion of the leg member (19) outside the housing (25) for preventing the leg member (19) from being pushed in the housing (25). When putting the housing (25) on a table, the leg member (19) contacts the table so as to work as a cushion.

The retaining recess (23), the cord bushing (3a), the melting member (5) and other members of the case (1) and the lid member (2) can be constituted in the same way as the above-explained first through third embodiments.

The leg member (19) abuts an inner circumferential surface of the through hole (20) elastically, so that the through hole (20) is sealed by the leg member (19) in the normal state, for example, non-gas generated state. If a gas generates in the space within the housing (25) due to a breakdown of an electronic component, and the inner pressure increases, the gas can flow a path between the through hole (20) and the leg member (19) by pressing and deforming the leg member (19) elastically so that the gas can be released outside. Therefore, a burst of the housing (25) due to the increase of the inner pressure can be prevented.

In the above embodiments, the melting member (5) has a melting point lower than those of the case (1) and the lid member (2). Accordingly, even after the device (40) is sealed in the sealed container, the cord bushing (3a) may be easily removed from the sealing container by melting the melting member (5) without damaging the case (1) and the lid member (2).

Although the case (1) and the lid member (2) have rectangular shapes in the above described embodiments, these may have, for example, circular shapes in all of the above-described embodiments.

In the above described embodiments, the fit-in portion (14) of the cord bushing (3a) fits in the inner groove (9) of the retaining recess (23), and the stopper portion (12) places outside of the case (1), so that the small-dimension portion (13) is in the retaining recess (23). However, the stopper portion (12) of the cord bushing (3a) may fit in the inner groove (9) of the retaining recess (23) in all of the above-described embodiments. Then, the fit-in portion (14) of the cord bushing (3a) places inside of the case (1), so that the small-dimension portion (13) is in the retaining recess (23).

Further, the weld rib may be provided on the surface of the case (1) which faces the lid member (2).

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. A sealing container assembly configured to hermetically contain a device therein, comprising:
    a case having an opening and configured to contain the device therein;
    a lid member configured to be connected to the case by welding to close the opening of the case;
    a connecting member configured to connect the device contained inside the case to an outside of the case and configured to be sandwiched between the case and the lid member; and
    a melting member having a melting point lower than those of the case and the lid member and being configured to be melted to seal gaps between the connecting member and the case and between the connecting member and the lid member when the lid member is connected to the case by welding.

2. A sealing container assembly according to claim 1, wherein the connecting member is made from a material different from materials which the case and the lid member are made from.

3. A sealing container assembly according to claim 1, wherein the melting member is provided on the lid member to be configured to face the connecting member.

4. A sealing container assembly according to claim 1, wherein the lid member has an inside surface configured to face the case and comprises a weld rib which is provided on the inside surface and which is configured to be welded to the case.

5. A sealing container assembly according to claim 4, wherein the weld rib is made from a same material as other portions of the lid member.

6. A sealing container assembly according to claim 4, wherein the weld rib has a melting point lower than that of other portions of the lid member.

7. A sealing container assembly according to claim 4, wherein the weld rib is provided along a periphery of the inside surface and has a cutout portion, and wherein the melting member is provided in the cut out portion to be configured to face the connecting member.

8. A sealing container assembly according to claim 1, wherein the case has a recessed weld reception surface around the opening, the lid member has an inside surface configured to face the weld reception surface of the case, and wherein the lid member is configured to be inserted in the opening to be received on the weld reception surface and comprises:
    a seal member provided on an outer peripheral side surface of the lid member and being configured to seal gaps between the lid member and the case;
    a plurality of weld ribs which are provided on the inside surface and along a periphery of the inside surface and which are configured to be welded to the weld reception surface of the case; and
    the melting member provided on the seal member to be configured to face the connecting member.

9. A sealing container assembly according to claim 8, wherein the weld reception surface is provided with a groove portion which is formed along the weld reception surface.

10. A sealing container assembly according to claim 8, wherein the melting member is made from a same material as the seal member.

11. A sealing container assembly according to claim 1, wherein the melting member is provided on the connecting member to be configured to face the lid member.

12. A sealing container assembly according to claim 11, wherein the lid member has an inside surface configured to face the case and comprises a weld rib which is provided on the inside surface and along a periphery of the inside surface and which is configured to be welded to the case.

13. A sealing container assembly according to claim 1, wherein the case has a recessed weld reception surface around the opening and a groove portion is formed on the weld reception surface, the lid member has an inside surface configured to face the weld reception surface of the case, and wherein the lid member is configured to be inserted in the opening to be received on the weld reception surface and comprises:
    a seal member provided on an outer peripheral side surface of the lid member and being configured to seal gaps between the lid member and the case; and
    a weld rib which is provided on the inside surface and along a periphery of the inside surface and which is configured to be welded to the weld reception surface of the case, the weld rib being provided with a cutout portion configured to release excessive pressure in a sealing container.

14. A sealing container assembly according to claim 1, wherein the case is provided with a retaining recess on a surface of which a groove is provided and in which the connecting member is configured to be inserted, and wherein the connecting member has a flange which is configured to be inserted into the groove.

15. A sealing container assembly according to claim 1, further comprising:
    a pressure release mechanism configured to release excessive pressure in a sealing container.

16. A sealing container assembly according to claim 15, wherein the pressure release mechanism comprises a release valve which is provided in the lid member and configured to release pressure.

17. A sealing container assembly according to claim 16, wherein a valve hole is formed in the lid member and the release valve has a center shaft portion and first and second flange portions provided both ends of the center shaft, respectively, and the center shaft portion is fitted into the valve hole to seal the valve hole and to release excessive pressure by being elastically deformed.

18. A sealing container hermetically containing a device therein, comprising:
    a case having an opening and containing the device therein;

a lid member connected to the case by welding to hermetically close the opening of the case;

a connecting member connecting the device contained inside the case to an outside of the case, the connecting member being sandwiched between the case and the lid member; and a melting member sealing gaps between the connecting member and the case and between the connecting member and the lid member by being melted when the lid member is connected to the case by welding, the melting member having a melting point lower than those of the case and the lid member.

19. A method for sealing a device in a sealing container, comprising:

providing the device in a case, the device being connected to an outside of the case via a connecting member;

providing the connecting member to be sandwiched between the case and a lid member;

connecting the lid member to the case by welding to close an opening of the case; and melting a melting member to seal gaps between the connecting member and the case and between the connecting member and the lid member when the lid member is connected to the case by welding, the melting member having a melting point lower than those of the case and the lid member.

* * * * *